(12) United States Patent
Okamura

(10) Patent No.: US 6,778,880 B2
(45) Date of Patent: Aug. 17, 2004

(54) DISTRIBUTION SYSTEM

(75) Inventor: Eiji Okamura, Tokyo (JP)

(73) Assignee: Leading Information Technology Institute, Inc., Tokyo (JP)

( * ) Notice: Subject to any disclaimer, the term of this patent is extended or adjusted under 35 U.S.C. 154(b) by 0 days.

(21) Appl. No.: 10/356,682

(22) Filed: Jan. 31, 2003

(65) Prior Publication Data

US 2003/0171843 A1 Sep. 11, 2003

Related U.S. Application Data

(63) Continuation of application No. 09/746,847, filed on Dec. 21, 2000, now Pat. No. 6,611,732, and a continuation of application No. 09/746,846, filed on Jun. 22, 2001, now abandoned.

(30) Foreign Application Priority Data

| Nov. 22, 1999 | (JP) | ............................................ 11-365285 |
| Jan. 31, 2000 | (JP) | ..................................... 2000-021916 |
| Apr. 4, 2000 | (JP) | ..................................... 2000-102483 |
| Jul. 19, 2000 | (JP) | ..................................... 2000-219821 |
| Jul. 21, 2000 | (JP) | ..................................... 2000-221299 |
| Sep. 5, 2000 | (JP) | ..................................... 2000-268325 |

(51) Int. Cl.[7] .............................................. G06F 7/00
(52) U.S. Cl. ..................................... 700/226; 700/225
(58) Field of Search ................................ 700/225, 226; 705/28, 29

(56) References Cited

U.S. PATENT DOCUMENTS 5,038,283 A    8/1991  Caveney ..................... 364/403
5,151,684 A    9/1992  Johnsen ....................... 340/572
5,469,363 A   11/1995  Saliga .......................... 364/478
5,712,789 A    1/1998  Radican ....................... 364/478
5,768,140 A    6/1998  Swartz et al. ................ 364/478
5,892,441 A    4/1999  Woolley et al. ............. 340/539
6,025,780 A    2/2000  Bowers et al. ........... 340/572.3
6,094,133 A    7/2000  Shimamura et al. ........ 340/505
6,118,379 A    9/2000  Kodukula et al. .......... 340/572
6,148,249 A   11/2000  Newman ..................... 700/225
6,332,098 B2  12/2001  Ross et al. .................. 700/226
6,342,830 B1   1/2002  Want et al. ................ 340/10.1

FOREIGN PATENT DOCUMENTS

JP          8-073009          3/1996
JP         10-324405         12/1998

Primary Examiner—Gene O. Crawford

(57) ABSTRACT

A distribution system in which many types of small-volume products classified according to product type, which includes clothing, accessories, shoes, bags, and wallets, design, color, and size are combined for shipping in one or more packing boxes to a retail store. Products 9 are packed in a package 4 at a shipping site 1 and shipped via a distribution network 3 to a receiving site 2. An electronic package tag 5 containing data on a plurality of packed products 9 of differing type, color, and size is attached to each packing box, and electronic product tag 10 containing specific product data is attached to each packed product 9. The data stored on the electronic package tag 5 and the electronic product tags 10 is read at the receiving site 2, compared to the intended package contents were actually received. The thus-verified data may be stored in a database system 34, and printed on a printer 35

10 Claims, 6 Drawing Sheets

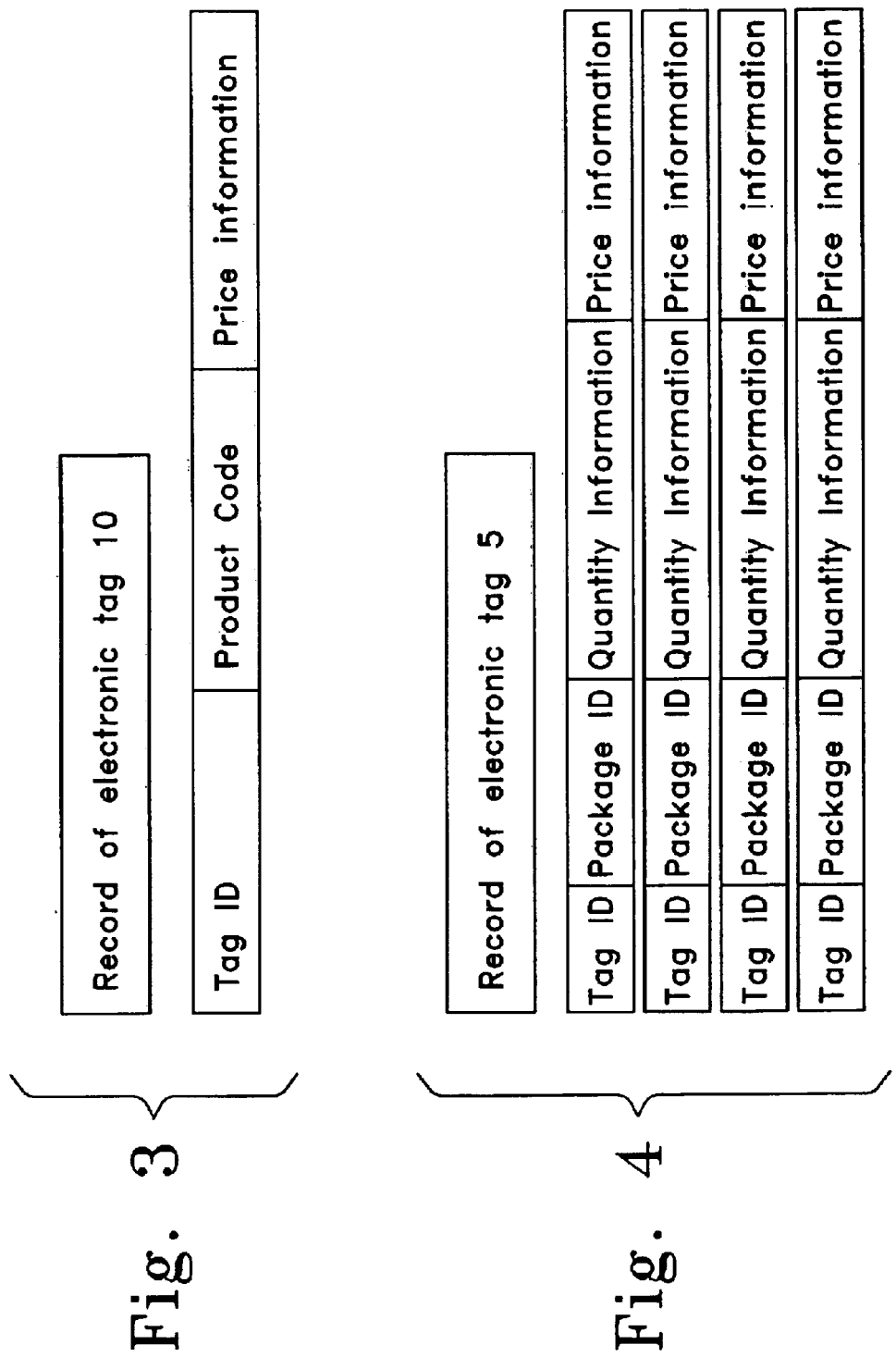

DISTRIBUTION SYSTEM

This application is a continuation of my commonly assigned copending application 09/746,847, filed Dec. 21, 2000 now U.S. Pat. No. 6,611,732, and includes subject matter originally incorporated by reference from my commonly assigned application Ser. No. 09/746,846, filed Jun. 22, 2001 now abandoned, entitled DISTRIBUTION SYSTEM;

REFERENCE TO RELATED APPLICATION(S)

The following commonly assigned applications relating to various aspects of electronic tag technology that may be used in combination with the present invention were also referenced in commonly assigned application Ser. No. 09/746,847, filed Dec. 21, 2000 entitled DISTRIBUTION SYSTEM; and are hereby incorporated in their entirety by reference:

1) Ser. No. 09/746,845, filed Dec. 21, 2000, entitled ELECTRONIC TAG DEVICE;
2) Ser. No. 09/746,844, filed Dec. 21, 2000, entitled INVENTORY CONTROL SYSTEM;
3) Ser. No. 09/746,849, filed Dec. 21, 2000, entitled ELECTRONIC TAG DEVICE; and
4) Ser. No. 09/746,848, filed Dec. 21, 2000, entitled PRODUCT INSPECTION DEVICE

TECHNICAL FIELD

The present invention relates the use of electronic tags in a distribution system which delivers clothing fabric, clothing, shoes, handbags, wallets, jewelry, precious metals, accessories, cash, securities, and the like, and in particular relates to a distribution system in which small quantities of several different such products may be delivered in one or more packages to a retail store or other customer facility.

PRIOR ART

Conventional distribution systems for the process of shipping and in-store storage of varying types of products for retail stores use a mixed packing method in which a plurality of products of differing types, designs, colors, and sizes are packed in one package in accordance with a package content list for each package that indicates in detail the products contained therein. These conventional distribution systems require a new package content list to be prepared for every box. At the receiving site, the expected product data must both be compared to valid data on actual product inventory and, when the package arrives, be updated to valid data.

A prior art distribution system in which a combination package is used and a packing list is attached thereto may include a shipping site having a data processing device which includes a send and receive function, a receiving site having data processing device which includes a send and receive function and a printer, a distribution network, and a communications network. Products that are to be sent to a receiving site are prepared and stored in the package according to a packing list, an electronic copy of which is attached to the package and is delivered to the receiving site via the distribution network.

SUMMARY OF INVENTION

The distribution system according to the present invention includes a shipping site, a receiving site, and a distribution network. An electronic tag is attached to a package to be shipped via this distribution network, the electronic tag having data to identify the products in the package, and quantity or price data, stored thereon. An electronic tag is also attached to each product inside the package and has data relating to the product stored thereon.

The shipping site displays a work order packing list for products to be shipped to the receiving site in one or more packages. A tag write device writes data on the electronic tag of each package regarding the packed products inside that package. The receiving site reads the data stored on the electronic tag of each package, verifies it with the data stored on the electronic tags of all the products inside that package, and stores some or all of the verified data in a separate receiving site data base.

By comparing both sets of data, the similarity of the contents of the package at the shipping site and the contents of the package shipped to the receiving site can be easily confirmed without opening the package, and the integrity of the receiving site data base may be maintained.

BRIEF DESCRIPTION OF THE DRAWINGS

An exemplary embodiment of the invention will now be described in detail with reference to the appended Drawings, in which:

FIG. 3 illustrates an exemplary record of a product electronic tag.

FIG. 4 illustrates an exemplary record of a package electronic tag.

DETAILED DESCRIPTION OF A PREFERRED EMBODIMENT OF THE INVENTION

Figure 1:
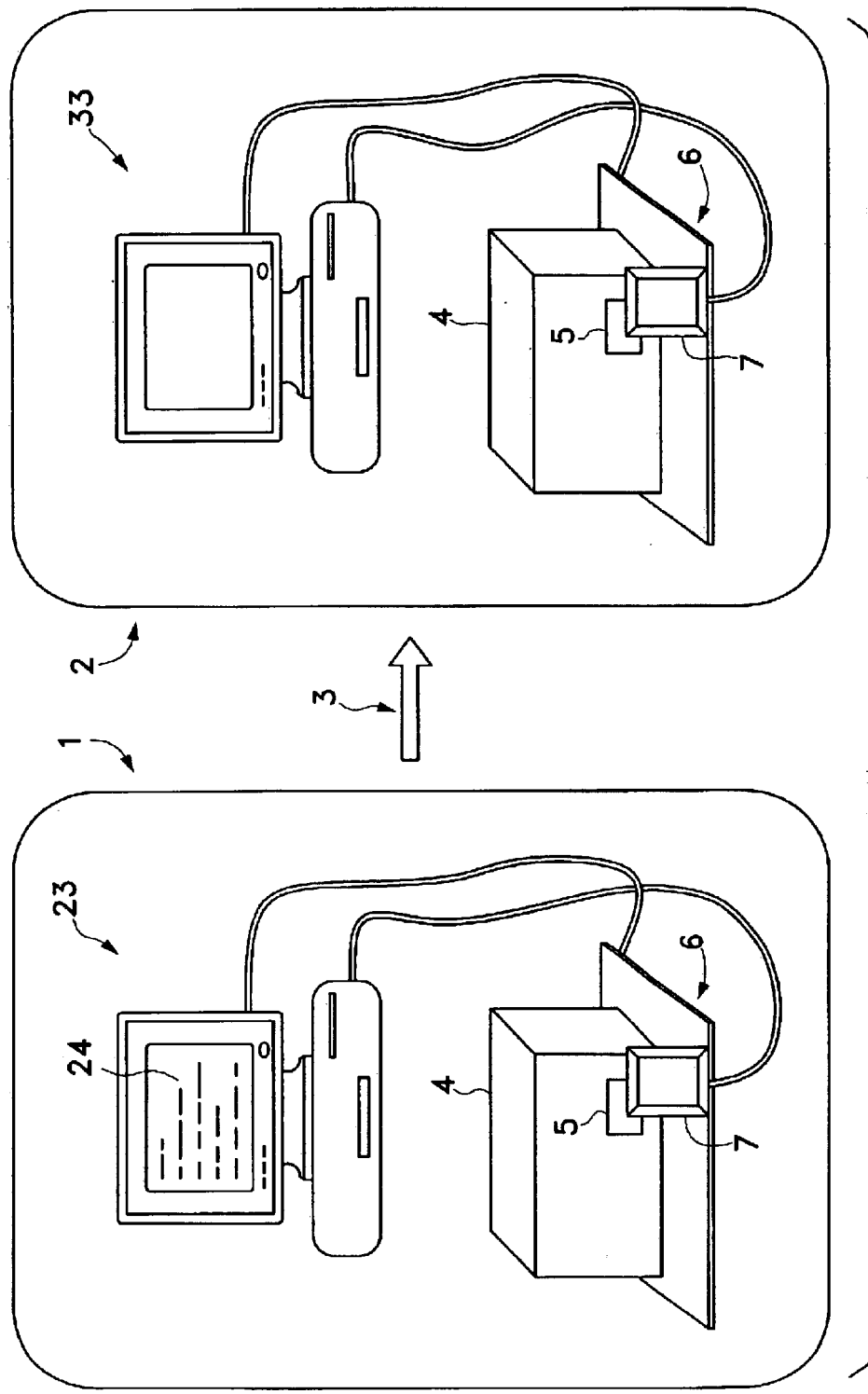
FIG. 1 is an overview of an embodiment of the distribution system of the invention.

As shown in FIG. 1, a distribution system ships products packed in a package 4 at a shipping site 1 via a distribution network 3 to a receiving site 2. Each package 4 includes an electronic package tag 5 containing data on the packaged products.

Figure 2:
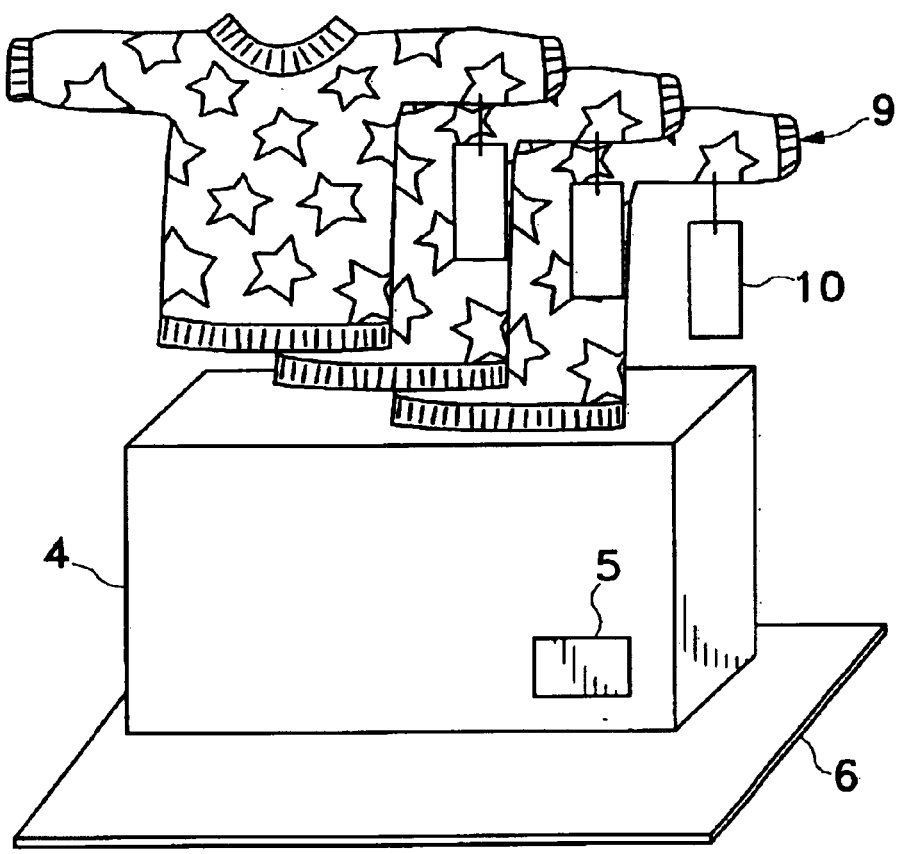
FIG. 2 is an external view showing the package to which the package electronic tag is attached and products to which product electronic tags.

As shown in FIG. 2 (products 9 and electronic tags 10 are removed from package 4 for clarity), electronic tag 5 is attached to package 4 to be shipped, and in addition, an electronic tag 10 is attached to each product 9 to be placed in package 4.

The products contained in the package 4 may be of a plurality of types, and, as will be explained in more detail hereinafter, the data stored on the electronic package tag 5 preferably contains quantity information and specific data on the type, color, size, and other attributes of the packed products.

In the distribution system of the invention, the shipping site 1 (see also FIG. 6) comprises a computer workstation 23 that displays a packing workorder 24 that lists a number of products to be packed in one or more packages 4 and a tag read/write device 7 that writes data regarding the packed products on the electronic package tag 5. The receiving site 2 (see also FIG. 7) comprises a tag read/write device 7 that reads the data stored on the electronic package tag 5, a database system 34 that stores some or all of the data stored on the electronic package tag 5, and a printer 35 that prints the data stored on the electronic package tag 5.

Furthermore, in the distribution system according to the invention, either the shipping site 1 or the receiving site 2 may be the division that generates any paper forms associated with the packages. In either case, the shipping site 1 performs a collection and delivery function for mixing the collected products of differing types and packaging them according to the individual receiving site units as reflected in the workorder 24.

The composition of shipping site 1 and receiving site 2 is approximately the same. They each preferably include an electronic tag read/write device 7 for reading from and writing to electronic tag 5 attached to package 4, an electronic tag reading device 6 for reading electronic tags 10 attached to products 9 placed in package 4 (as shown in FIG. 2), and a computer workstation 23, 33 for controlling the operation of electronic tag read/write device 7 and electronic tag reading device 6 connected thereto.

As shown in FIG. 1, electronic tag reading device 6 for reading electronic tag 10 attached to product 9 is flat shaped, and each electronic tag 10 inside package 4 can be read by radio signals by a suitable wireless reading device 7.

Electronic tags 5 and 10 are electronic tags composed of electrical elements, and have a large storage capacity. The storage capacity can be easily overwritten electronically from outside the electronic tag. And, because they are lightweight, attaching them to packages used in general distribution and to products does not cause any difficulties.

In particular, at least the electronic tags 10 attached to products 9 are no-contact type wireless tags. When a specific electro-magnetic frequency is used from outside thereof and data is requested to be read out, because it outputs an ID code, one no-contact type wireless tag is specified from amongst a plurality of no-contact wireless tags by identifying and calling the ID. The stored data can be read and overwritten, and even if product 9 in package 4 is a plurality of items and/or a plurality of types, each electronic tag 10 data can be read without opening package 4 and all data relating to each product 9 can be obtained.

In the distribution system according to the present invention, package 4 with product 9 placed therein is shipped to receiving site 2 via distribution network 3 with electronic tag 5 attached to the surface thereof.

As part of the shipping process, computer workstation 23 in shipping site 1 activates electronic tag reading device 6, which reads the data (see also FIG. 3) from the electronic tag 10 attached to each product 9 disposed in package 4. Details regarding data identifying product 9 and the quantity of product 9 placed in package 4 is processed and produced.

Next, the detailed data produced regarding product 9 stored in package 4 and other related data (such as Package ID Quantity Information—see FIG. 4) is written onto electronic package tag 5 by electronic tag read/write device 7.

As shown in FIG. 3, the data stored on electronic tag 10 is data needed for distribution, such as the Tag ID for identifying itself, the Product Code identifying product 9, and Price Information relating to the purchase price or the fixed retail price of product 9.

Further, as shown in FIG. 4, the data stored on electronic tag 5 is data showing items such as the Tag ID for identifying itself, the Package ID, Quantity Information data for each product in package 4, and product Price Information data. This data is stored on electronic tag 5 on each package 4 containing product 9.

Figure 5:
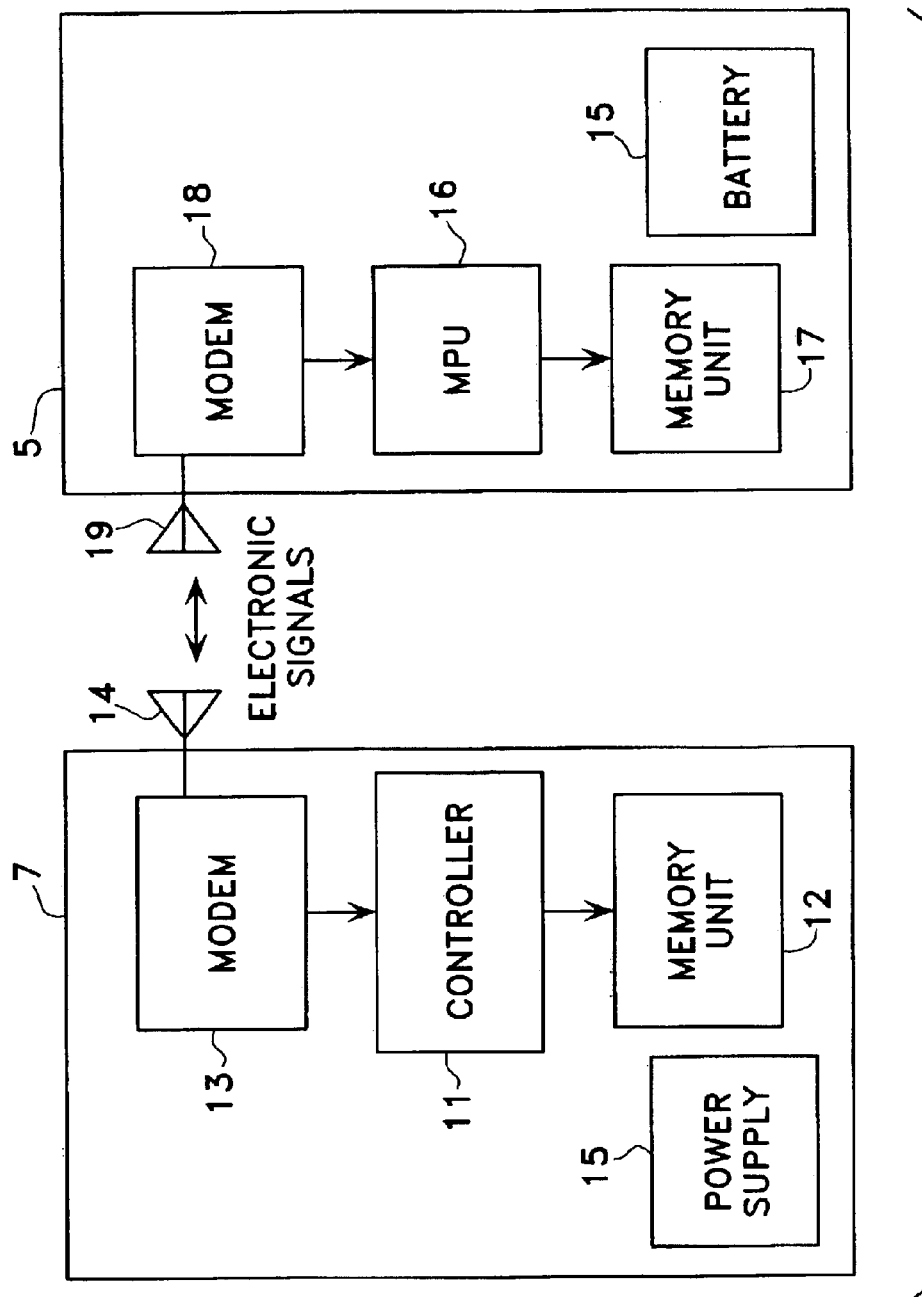
FIG. 5 is a block diagram showing the package electronic tag and the tag read/write device.
Figure 6:
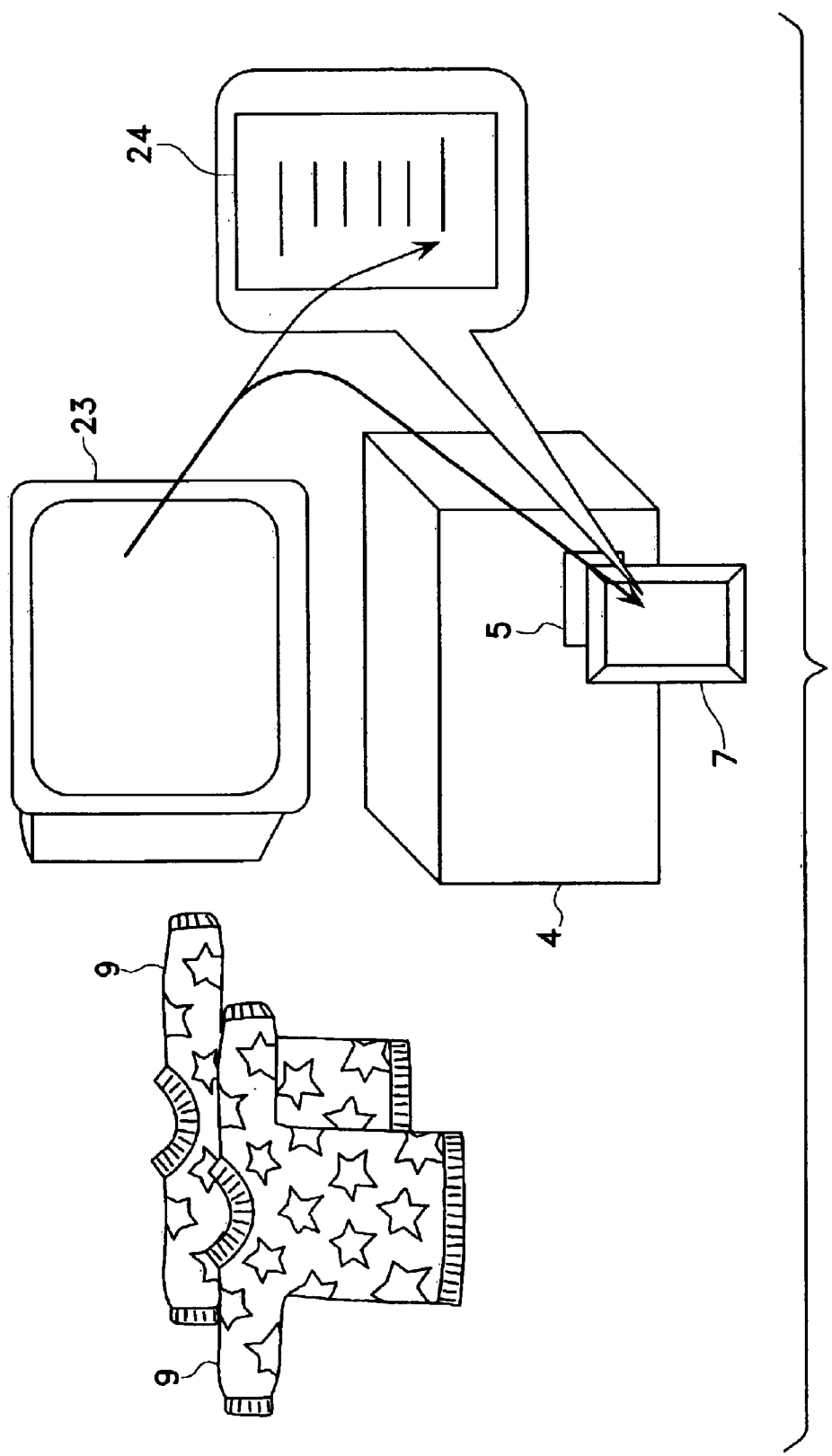
FIG. 6 illustrates shipping procedures at the shipping site.

As shown in FIG. 5, each tag read/write device 7 comprises a memory unit 12 and a modem 13 controlled by a controller 11, an antenna 14 connected to the modem 13, and a power supply 15. FIG. 6 also shows the electronic package tag 5, which is a card-shaped, non-contact wireless tag comprising a memory unit 17 and a modem 18 controlled by an MPU 16, an antenna 19 connected to the modem 18, and a battery 15. The electronic package tag 5 need not be a non-contact, wireless tag and may instead be a rewritable contact tag.

The electronic tag 5—which comprises the high-capacity memory unit 17 whose content can be easily rewritten electronically—is lightweight and compact. As FIG. 2 shows, it may be attached to the outside of the package 4, which is used in general distribution, without being a hindrance. When the electronic tag 5 is of the non-contact, wireless variety, it can be placed within the package 4 to prevent accidents in which it rubs against something during shipping and is pulled from the box.

As seen in FIG. 6, the number of products 9 to be sent to the receiving site 2 are packed into the package 4 according to the instructions 24 displayed by computer workstation 23 at the shipping site 1. Every time packaging is performed, required data on the products 6 is written onto the electronic package tag 5, so the electronic tag 5 always contains the product numbers of the products packaged in the package 4 or the name and the quantity thereof. Data on color, size, and other attributes may also be written for products such as clothing, accessories, shoes, bags, wallets, etc.

When the package 4 becomes full and packing and packaging are complete, the particular package 4 to which the electronic tag 5 is attached is sent via the distribution network 3 (FIG. 1) to the receiving site 2. At this time, the package 4 to which the electronic tag 4 is attached leaves the proximity of the computer 23 and the tag read/write device 7, so no more data is written on the electronic tag 5, and the computer 23 writes work data (i.e., data on products to be packaged) onto the electronic tag 5 of the next package 4.

In other words, the package 4 and the electronic tag 5 move as a unit in the distribution system according to the invention, and the data on the electronic tag 5 is stored while the products 9 are being packed in the package 4 to which the electronic tag 5 is attached. Data is therefore automatically limited to the products 9 packed, and data stored on the electronic tag 5 attached to each package 4 is limited to that on the products 9 stored in the package 4 even when packing is performed on a plurality of packages 4 in succession.

Figure 7:
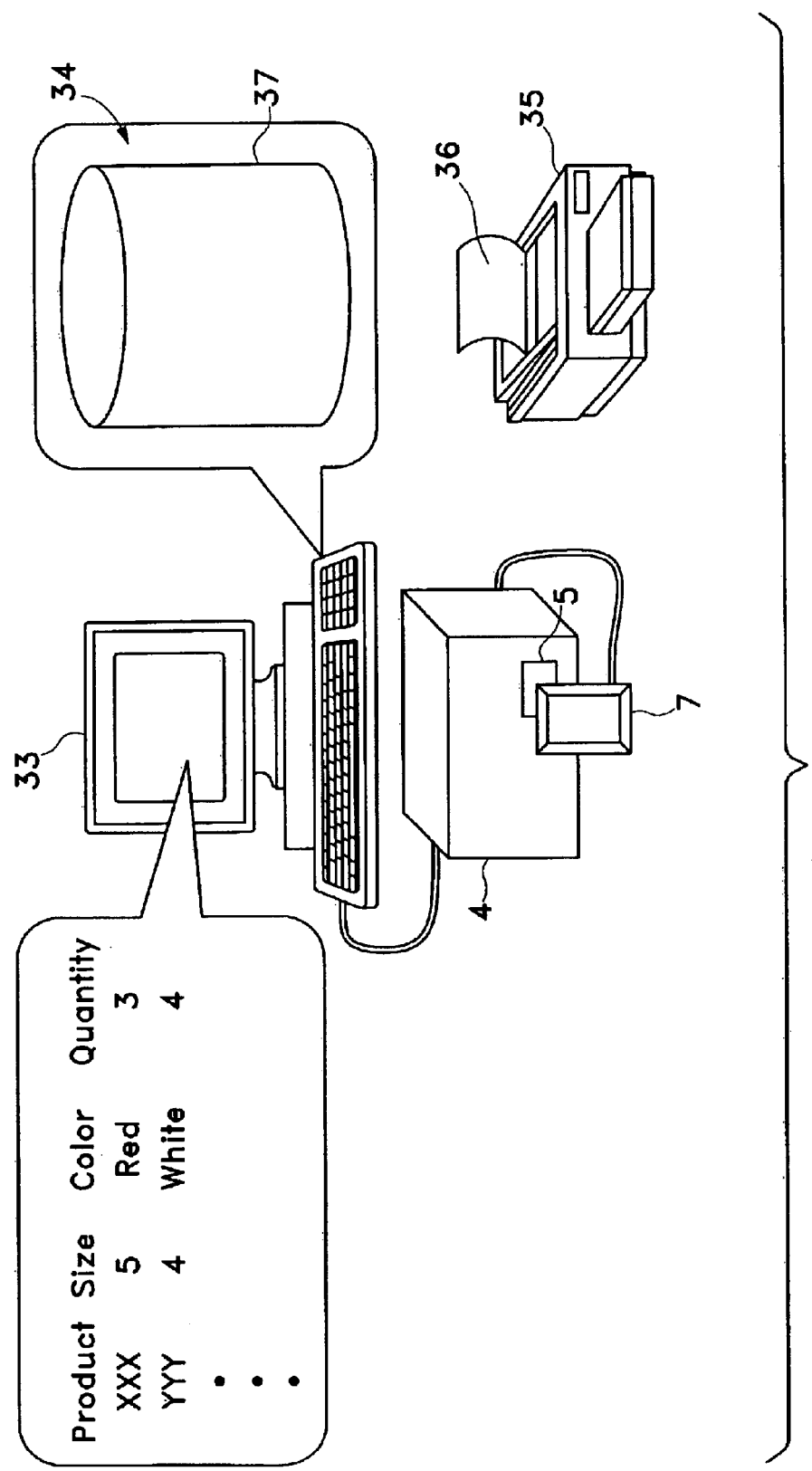
FIG. 7 illustrates receiving procedures at the receiving site.

As shown in FIG. 7, the receiving site 2 comprises a computer 33 with a database system 34 that electronically stores details on package content, a printer 35 that prints a package content list 36, and a tag read/write device 7 that reads and writes data from and to the electronic tag 5 attached to the package 4. The computer 33, via the tag read/write device 7, reads data on the products 6 contained in the corresponding package 4 from the electronic tags 5 of the packages 4 arriving at the receiving site 2 via the distribution network 3. Data 37 in the database system 34 is updated, and the updated data is displayed on the display 33 and may be printed out as a package content list 36 from the printer 35.

Thus, in the distribution system of the invention, the data on the products 9 contained in the packages 4 is provided without delay to the receiving site 2 simultaneously with the arrival of the packages 4 at the receiving site 2.

As shown in FIG. 1, receiving site 2 is provided not only with package tag reader 7, but also with wireless product tag reader 6, which are both connected to receiving site computer workstation 33. The data on electronic package tag 5 and electronic product tag 10 (FIG. 2) is compared by computer 33, and by confirming the similarity between the two sets of data, it can confirm that the product in package 4 is the same product that was shipped from shipping site 1.

At receiving site 2, when package 4 is delivered, similar to shipping site 1, electronic tag reading device 6 first reads the data on electronic tag 10 attached to product 9 disposed in package 4. In addition, the data on electronic tag 5 attached to package 4 is read by electronic tag read/write device 7. At this time, it is not necessary to open package 4.

The material composing package 4 is at least that in which electro-magnetic waves pass through the portion facing electronic tag reading device 6, and is mechanically strong. Material in which there is no difficulties when shipping valuable goods is needed.

Further, even though electronic tag 5 attached to package 4 is a no-contact type electronic tag, because electronic tag 5 is attached to the surface of package 4, a contact-type of electronic tag is acceptable, and it can be easily read and written to by read/write device 7.

Further, receiving site 2 can be a transit location and a shipping site by resending packages to the next receiving site. That is, it is possible for shipping site 1 and receiving site 2 to be interchangeable. In the transit location, the confirmation of the quantity etc. of product can be reliably conducted without opening package 4, and thus it becomes possible to ship package 4 to the next receiving site in a short amount of time.

In the distribution system according to the described embodiment of the present invention, shipping site 1 and receiving site 2 include separate reading device 6 and read/write device 7 for recording data on electronic tags 5 and 10. However, the composition of computer 33 and controller 11 can be modified and the number of connections reduced by combining devices 6 and 7 into one unit.

As is clear from the explanation based on the aforementioned embodiments, with the distribution system according to the present invention, the confirmation of products in packages at shipping site 1 and shipping site 2 can be done quickly without opening the packages. Because a comparison of the details of the contents thereof can be carried out, improvements in the work of confirming the similarity of the goods transported in the distribution system and the data relating thereto can be designed.

Further, because number examinations of packages in the transportation network can be carried out without opening them, the task of confirmation at the time of shipping can be eliminated, there are no concerns about damaging or soiling products due to unpacking and repacking, and the risk of robbery can be reduced.

In particular, there is a significant effect exhibited when shipping goods with several designs or prices or the like, and with an expensive item such as high quality fabric, high quality clothing, high quality shoes, a high quality wallet, jewelry, precious metal, an accessory, cash, securities and the like.

As is clear from the above description of an embodiment of the invention, the distribution system of the invention, which packs a plurality of differing types of products in one package and sends data on the products contained in the package together with the package, brings about the effects discussed below.

(1) A transmission route for sending data on the packaged products is unnecessary.

(2) Divisions in product packing for each package are automatically made to correspond to divisions in the data on the products written and stored on the electronic tags, so preparation of package content data based on differences between the actual packing records and packing instructions is unneeded. Furthermore, a quantity comprising a full package can be determined from the actual packing records, so steps adding redundancy to packing and thus reducing packing efficiency are eliminated.

(3) A package and its package content data arrive simultaneously at the receiving site, so the system is liberated from the task of confirming the validity of inventory information. Moreover, even if an accident were to prevent some of the packages from arriving at the receiving site, inventory information at the receiving site would not be put into disarray as a result.

Forms on which package content lists for the packages are written are normally prepared at the receiving site as one delivery task, but the distribution system of the invention also permits form preparation to be performed by the division handling sorting at the shipping site, so any required forms can be attached to the packages, thereby eliminating the need for any printer 35 at the receiving site 2.

What is claimed is:

1. In a distribution system in which a plurality of differing types of products of differing shapes and sizes are packed at a shipping site in one or more sealed packages for transportation via a distribution route to a receiving site, with at least one portion of the sealed package being composed of a material through which can pass high frequency signals;

a respective no-contact type wireless electronic product tag attached to each of a plurality of products to be placed inside said sealed package, with article specific article specific data corresponding to the respective attached item being stored on each said electronic product tag, said article specific data including data for identifying the attached item;

an electronic tag attached to each of said packages for storing package specific data, said package specific data including data for identifying said package and its intended contents;

a computer workstation at the shipping site for generating a work order specifying the products to be shipped to said receiving site but not specifying which of said products is to be placed into a particular said package;

a first product tag reading device at the shipping site that reads said article specific data from each electronic product tag as the associated product is being placed in said package;

a package tag writing device at the shipping site that writes said article specific data onto the electronic package tag attached to each said package as specific products on the work order are packed in that package whereby the article specific data stored in the package tag is complete and accurate even if the associated package is sealed and shipped with only some of the products specified on the work order;

a second product tag reading device at the receiving site that reads said article specific data from each electronic product tag before the sealed package is opened and the associated product can be removed from said package;

a package tag reading device at the receiving site that reads said article specific data from the electronic pacgage tag attached to the sealed said package;

a computer workstation at the receiving site connected to the second product tag reading device and to the package tag reading device for comparing the article specific data with the package specific data to thereby confirm that the intended package contents correspond to the actual contents; and a database system at the receiving site responsive to the computer workstation that stores some or all of the article specific data and the package specific data after the computer workstation has thus confirmed that the intended package contents were actually received.

2. The distribution system according to claim 1, wherein at least some of said products are selected from the group consisting of fabric, clothing, shoes, handbags, wallets, jewelry, precious metals, cash, and negotiable instruments.

3. The distribution system according to claim 1, wherein the shipping site derives at least some of the package specific data from article specific data previously stored on the electronic product tags, and the package tag writing device writes the thus-derived data onto the electronic package tag.

4. The distribution system according to claim 1, wherein the electronic package tag is disposed on an outer surface of the package.

5. The distribution system according to claim 1, wherein the electronic tag is a non-contact, wireless tag.

6. The distribution system according to claim 1, wherein the data stored on the electronic tag comprises data and quantities for specifying the products to be packed in the package.

7. The distribution system according to claim 1, wherein the data stored on the electronic tag contains at least one or both of the color and/or the size of the products to be packed.

8. The distribution system according to claim 1, wherein the receiving site comprises means for displaying the data stored on the electronic tag.

9. The distribution system according to claim 1, wherein the shipping site performs a collection and delivery function that mixes collected products of different types and packs them according to individual receiving site units.

10. The distribution system according to claim 1, wherein the receiving site is a store that sells the product.

* * * * *